(12) United States Patent
Hirose et al.

(10) Patent No.: US 11,842,644 B2
(45) Date of Patent: Dec. 12, 2023

(54) SYSTEM FOR OPERATING COMMERCIAL VEHICLES

(71) Applicants: Nissan Motor Co., Ltd., Yokohama (JP); Renault S.A.S., Boulogne-Billancourt (FR)

(72) Inventors: Satoru Hirose, Kanagawa (JP); Hiroya Fujimoto, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 562 days.

(21) Appl. No.: 15/734,256

(22) PCT Filed: Jun. 13, 2019

(86) PCT No.: PCT/IB2019/000589
§ 371 (c)(1),
(2) Date: Dec. 2, 2020

(87) PCT Pub. No.: WO2019/243883
PCT Pub. Date: Dec. 26, 2019

(65) Prior Publication Data
US 2021/0217313 A1  Jul. 15, 2021

(30) Foreign Application Priority Data
Jun. 18, 2018 (JP) .................. 2018-115123

(51) Int. Cl.
G06Q 10/02 (2012.01)
G08G 1/00 (2006.01)
G01C 21/34 (2006.01)
G06Q 10/047 (2023.01)
G06Q 10/0631 (2023.01)

(52) U.S. Cl.
CPC ......... G08G 1/202 (2013.01); G01C 21/3407 (2013.01); G01C 21/3446 (2013.01);
(Continued)

(58) Field of Classification Search
CPC ...... G08G 1/202; G06Q 10/047; G06Q 10/02; G06Q 10/0631; G06Q 50/30;
(Continued)

(56) References Cited

U.S. PATENT DOCUMENTS 8,890,717 B2 * 11/2014 Mcclellan ............. G01S 5/0027
340/936
10,102,586 B1 * 10/2018 Marlow ................ B64C 39/024
(Continued)

FOREIGN PATENT DOCUMENTS

EP          1 467 303 A2    10/2004
JP       2005-309721 A      11/2005
(Continued)

OTHER PUBLICATIONS

Elshenawy et al., Scalable and Location-Aware ITS Content Management in Vehicular Environments, 2010, IEEE, p. 627-633 (Year: 2010).*

(Continued)

*Primary Examiner* — McDieunel Marc
(74) *Attorney, Agent, or Firm* — Global IP Counselors, LLP

(57) ABSTRACT

A commercial vehicle operation system is provided with a server that can respectively communicate with a vehicle terminal of a commercial vehicle and with a user terminal owned by a user via a communication network. The server includes a communication unit, a vehicle operation information management unit that acquires and manages vehicle operation information including at least current location information of the commercial vehicle, and a roaming travel execution determination unit that determines whether to carry out roaming travel based on current location information of the commercial vehicle.

11 Claims, 5 Drawing Sheets

(52) U.S. Cl.
CPC ........... *G06Q 10/02* (2013.01); *G06Q 10/047* (2013.01); *G06Q 10/06315* (2013.01)

(58) Field of Classification Search
CPC ......... G06Q 10/06315; G06Q 2240/00; G01C 21/3446; G01C 21/3407
See application file for complete search history.

(56) References Cited

U.S. PATENT DOCUMENTS

| | | | | |
|---|---|---|---|---|
| 10,453,107 | B2* | 10/2019 | Roche | G06Q 10/02 |
| 11,180,116 | B2* | 11/2021 | Suzuki | G05D 1/0088 |
| 11,210,689 | B2* | 12/2021 | Watanabe | G06Q 30/0207 |
| 11,493,348 | B2* | 11/2022 | Levy | B60Q 1/507 |
| 11,543,817 | B2* | 1/2023 | Takechi | H04W 4/33 |
| 11,587,193 | B2* | 2/2023 | Liu | G01C 21/3685 |
| 11,709,062 | B2* | 7/2023 | Inoue | G01C 21/3492 |
| | | | | 701/533 |

FOREIGN PATENT DOCUMENTS

| | | |
|---|---|---|
| JP | 4458453 B2 | 4/2010 |
| JP | 2012-73979 A | 4/2012 |

OTHER PUBLICATIONS

Santa et al., A Framework for Supporting Network Continuity in Vehicular IPV6 Communications, 2014, IEEE, p. 17-34 (Year: 2014).*

Yang et al., Use of MOBITEX Wireless Wide Area Networks as a Solution to Land-Based Positioning and Navigation, 1994, IEEE, p. 29-35 (Year: 1994).*

Thomopouloss et al., ToD Pilot: A Location-Based Taxi on Demand System Demonstrator, 2007, IEEE, p. 1-7 (Year: 2007).*

Seow et al., "A Collaborative Multiagent Taxi-Dispatch System", IEEE Transactions on Automation Science and Engineering, Jul. 2010, pp. 607-616, vol. 7, Issue 3, IEEE, New York.

Chebbi et al., "Cellular Genetic Algorithm for Solving a Routing On-Demand Transit Problem", GECCO '16: Proceedings of the Genetic and Evolutionary Computation Conference 2016, Jul. 20, 2016, pp. 301-308, Association for Computing Machinery, New York.

Less-Miller, "Minimising average passenger waiting time in personal rapid transit systems", Annals of Operations Research, Nov. 5, 2013, pp. 405-424, vol. 236, Springer Science + Business Media, New York.

* cited by examiner

SYSTEM FOR OPERATING COMMERCIAL VEHICLES

CROSS-REFERENCE TO RELATED APPLICATIONS

This application is a U.S. national stage application of International Application No. PCT/IB2019/000589, filed on Jun. 13, 2019.

TECHNICAL FIELD

The present invention relates to a commercial vehicle operation system that, as a mobility service, determines whether to allow a vehicle without a next-use reservation to travel in the vicinity of a given location in roaming fashion, and that may instruct the vehicle to follow a prescribed route.

BACKGROUND INFORMATION

As a conventional commercial vehicle operation system, a management device and a program that acquire, via a communication network, boarding information, which includes at least boarding time, boarding location, and destination, for each user, and allocate a commercial vehicle to conform to the conditions of the boarding information input by the user, are known (Japanese Patent No. 4458453—Patent Document 1).

SUMMARY

However, the prior art does not disclose specific control for those times that a commercial vehicle is not being utilized for dispatch/pickup. Thus, for example, if there is no reservation for use after the last user has been dropped off, in general, the vehicle is returned to a prescribed standby location, a request for dispatch from the next user is awaited, and a dispatch service is provided. Therefore, there is the problem of lost time and unnecessary energy consumption due to by the movement from the location where the last user was dropped off to the standby location. In other words, if the boarding location of the user who makes a next-use request is close to the location where the last user got off, time and energy would be wasted, which would not have been wasted if the vehicle were not returned to the prescribed standby location.

The problem to be solved by the present invention is to provide a commercial vehicle operation system that is capable of dispatching a vehicle to a subsequent user in a short period of time and with low energy consumption.

The present invention solves the problem described above by means of a commercial vehicle operation system for dispatching a commercial vehicle to a user as a means of transportation, which acquires current location information of the commercial vehicle, determines whether to allow the roaming travel of the commercial vehicle about the current location when there is no use request from a user, and outputs a travel command to the target commercial vehicle when it is determined that roaming travel of the vehicle should be allowed.

By means of the present invention, it is possible to determine whether to allow the roaming travel of a commercial vehicle around the current location based on the respective current location information of the user and the commercial vehicle of said system, and the system can thereby exhibit the effect that it is possible to suppress time and energy consumption required for the movement of the vehicle when a passenger is not on board.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below based on the drawings.

Figure 1:
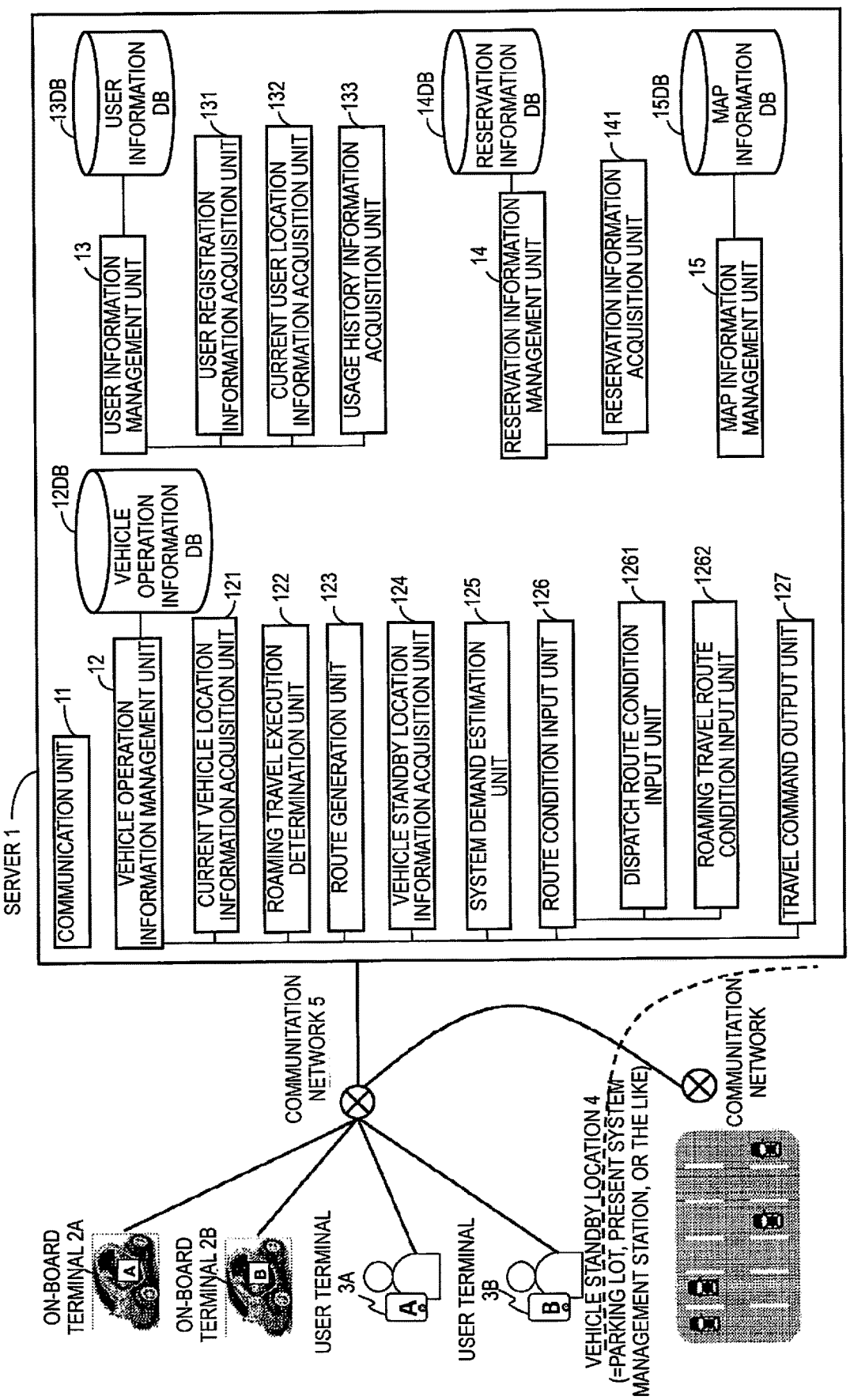
FIG. 1 is a block diagram of a commercial vehicle operation system according to an embodiment of the present invention.

FIG. 1 is a block diagram explaining the configuration of a commercial vehicle operation system according to an embodiment of the present invention. The commercial vehicle operation system according to the present embodiment includes a server 1, on-board terminals 2A and 2B mounted in commercial vehicles to be used by the users, user terminals 3A and 3B in possession of the respective users, and a communication network 5 for carrying out communication with a vehicle standby location 4. A commercial vehicle is a vehicle that is dispatched to a user in response to the user's request and that transports the user to their destination. On-board terminals 2A, 2B are communication devices that are mounted in commercial vehicles and that communicate with the server 1 to receive a dispatch command, or the like. The commercial vehicles of the commercial vehicle operation system shall include both manned operation vehicles having dedicated drivers and unmanned operation vehicles which are operated by means of autonomous driving control. The user terminals 3A, 3B are information communication terminals that are carried by the respective users registered to use the commercial vehicle operation system, such as smartphones, PDAs, and mobile PCs. The vehicle standby location 4 is a so-called parking lot, such as a parking lot managed exclusively for the commercial vehicles of the commercial vehicle operation system, a privately-owned hourly parking lot, the parking lot of a commercial facility, such as a supermarket, which can be used temporarily.

In the examples shown in FIG. 1, there are two on-board terminals of the commercial vehicles and two user terminals, but no limitation is imposed thereby. In practice, if there are three or more commercial vehicles, there are also three or more on-board terminals. In addition, if there are three or more users, there are three or more user terminals, corresponding to the number of the users. Only one of the vehicle standby location 4 is shown in FIG. 1, but, in practice, there are a plurality of locations.

The server 1 is an information processing device comprising a communication unit 11, a vehicle operation information management unit 12, a user information management unit 13, a reservation information management unit 14, and a map information management unit 15. The server 1 is composed of a computer having hardware and software. The server 1 is composed of a ROM (Read-Only Memory) that stores a program, a CPU (Central Processing Unit) that executes the program stored in this ROM, and a RAM (Random-Access Memory) that functions as an accessible storage device. In terms of the operating circuit, an MPU (Micro Processing Unit), a DSP (Digital Signal Processor), an ASIC (Application-Specific Integrated Circuit), a FPGA (Field Programmable Gate Array), etc., may be used in place of, or in addition to, the CPU (Central Processing Unit). And the communication unit 11, the vehicle operation information management unit 12, the user information management unit 13, and reservation information management unit 14, and the map information management unit 15 realize each of the functions described further below by means of software established in the ROM.

The communication unit 11 provides bidirectional information communication between the on-board terminals 2A, 2B mounted in the commercial vehicles and the user terminals 3A, 3B via a prescribed wireless telecommunication network, such as the Internet. Specifically, the communication unit 11 communicates usage status and content of use of the commercial vehicle, information relating to the user, current location information of the user, boarding location information, destination information, and the like. In addition, if there is a communication network installed in the vehicle standby location 4, the server 1 can receive real-time parking space availability status, information on the number of vehicles that can be parked, and the like, via said communication network.

The vehicle operation information management unit 12 acquires information necessary for managing the commercial vehicles that constitute the commercial vehicle operation system. In addition, the vehicle operation information management unit 12 operates the system based on the acquired information and carries out management control for appropriately dispatching commercial vehicles to users. The vehicle operation information management unit 12 includes a current vehicle location information acquisition unit 121, a roaming travel execution determination unit 122, a route generation unit 123, a vehicle standby location information acquisition unit 124, a system demand estimation unit 125, a route condition input unit 126, and a travel command output unit 127. In addition, information relating to all the managed commercial vehicles is stored in a vehicle operation information database 12DB.

The server 1 acquires the current location information of each commercial vehicle by means of the current vehicle location information acquisition unit 121 using satellite positioning such as a GPS or an autonomous positioning function using a vehicle speed sensor, a gyro sensor, and an acceleration sensor, for example. The acquired current location information is transmitted to the server 1 and is used for ascertaining the current locations of the commercial vehicles equipped with the on-board terminals 2A, 2B. In addition, if the commercial vehicle is an unmanned operation vehicle, the measured current location information of the commercial vehicle is also used for the autonomous driving of a host vehicle.

The server 1, by means of the roaming travel execution determination unit 122, determines whether each commercial vehicle should undertake roaming travel over the surrounding roads based on use reservation information, surrounding vehicle standby location information, the degree of demand for the system, and the like. Roaming travel according to the present embodiment means that the vehicle continues to travel on the road without being parked, by meandering about the roads or repeatedly moving back and forth. Roaming travel also includes temporarily stopping in accordance with a traffic signal or a road sign. In addition, dispatching according to the present embodiment means directing a vehicle toward a user's boarding location, or boarding the user and traveling to a destination.

The server 1 generates a route using the route generation unit 123 over which a commercial vehicle, which is determined by the roaming travel execution determination unit 122 that it should carry out roaming travel, to travel about the current location in roaming fashion. In addition, when a use request is received, a dispatch route to the boarding location of the user, and a route from the boarding location to the user's destination are generated. The route generation unit 123 carries out route generation in accordance with route conditions described further below.

The server 1 acquires vehicle standby location information to be used for route generation and roaming travel execution determination using the vehicle standby location information acquisition unit 124 as mentioned above. The vehicle standby location information includes information regarding locations in the vicinity of the current location of each commercial vehicle where vehicle standby is possible, as well as real-time availability status, information regarding the number of vehicle that can be parked, etc.

The server 1 estimates the probability that the system would be utilized at the current date and time and at the current location of each commercial vehicle using the system demand estimation unit 125. System demand according to the present embodiment means the availability of the commercial vehicle operation system at the current time for each commercial vehicle. Specifically, the system demand is estimated based on information regarding the current number of registered system users within a prescribed range from the current location of the host vehicle, usage history information over a certain period of time in the past for all registered system users currently present within a prescribed range from the current location of the host vehicle, or usage history information such as the day of the week, time of the day, boarding location, etc., in which the system was used within a prescribed range from the current location of the host vehicle. For example, it is determined that the greater the current number of registered system users present within a 1-km radius from the current location of the host vehicle, the greater the probability that said system would be reserved for use, and, thus, higher the system demand. In addition, it is determined that the greater the usage history over a certain period of time in the past for all registered system users currently present within a prescribed range from the current location of the host vehicle, the greater the probability that said system would be reserved for use, and, thus, the higher the system demand. Further, in the current status within a prescribed range from the current location of the host vehicle, if it is a particular day of the week, time of day, or boarding location that has a history of high usage, it is determined that the probability that said system would be reserved for use is also high, and that system demand is high.

The server 1 is provided with the route condition input unit 126, and receives input of conditions for determining a route for which a command to travel thereon is issued to each commercial vehicle. The route condition input unit 126 is equipped with a dispatch route condition input unit 1261, and a roaming travel route condition input unit 1262.

The server 1 receives inputs of conditions using the dispatch route condition input unit 1261 for determining a route for which each commercial vehicle is to be dispatched and on which it travels, from the current location of the host vehicle, via the boarding location of the user, to the user's destination. A system administrator who manages the system decides on the conditions of the travel route of each commercial vehicle and inputs the conditions in a program for managing the server. The input method may be a method for selection from the determined conditions by means of an input interface, or a method for inputting a new condition and carrying out a control. The following examples can be assumed to be specific conditions that can be selected, and any condition not listed below may be set and input by the system administrator:

the smallest energy consumption of the commercial vehicle,
    the shortest roaming travel distance of the commercial vehicle,
    The ability to reach the destination earliest,
    the use of toll roads, and
    No use of toll roads.

The conditions may be set for each commercial vehicle, and each setting may be based on a single condition, or a combination of a plurality of conditions.

The server receives inputs of the conditions using the route condition input unit 1262 for determining the route over which each commercial vehicle may travel in a roaming manner. The dispatch route condition input unit 1261 is used for implementation of the input method. The following examples can be assumed as specific conditions that can be selected, and any condition not listed below may be set and input by the system administrator:

the shortest mean arrival distance, from the current location of the commercial vehicle to the current locations of all registered system users currently present within a prescribed range,
    the shortest mean arrival time, from the current location of the commercial vehicle to the current locations of all registered system users currently present within a prescribed range
    the smallest energy consumption of the commercial vehicle,
    the shortest roaming travel distance of the commercial vehicle,
    the largest number of registered system users present within a prescribed range from the current location of the commercial vehicle,
    the largest usage history,
    the largest number of pedestrians and area residents, and
    the smallest amount of vehicle traffic.

The conditions may be set for each vehicle, and each setting may be based on a single condition or the combination of a plurality of conditions.

In the case that the roaming travel execution determination unit 122 determines that the vehicle should travel in a roaming manner, the travel command output unit 127 of the server 1 outputs a command to each commercial vehicle for roaming travel over the determined route. When there is a use request from a user, the travel command output unit 127 outputs a command to each commercial vehicle for the vehicle to be dispatched and to travel from the current location, via the boarding location of the target user, to the destination.

The user information management unit 13 manages information relating to the user, who is a customer that uses the commercial vehicle operation system. The user information management unit 13 includes a user registration information acquisition unit 131, a current user location information acquisition unit 132, and a usage history information acquisition unit 133, and the respectively acquired information is stored in a user information database 13DB.

The server 1 acquires information using the user registration information acquisition unit 131 relating to the user, the inputs and the registered uses by the user in advance in order to use the commercial vehicle operation system. User registration information is, specifically, basic information such as the name, gender, and age of the user, image information (for example, facial image) representing the characteristics of the appearance of the user, serving as identification information for identifying the user, authentication information regarding the user terminals 3A, 3B owned by the users, credit card number information used for paying system usage fees, and the like.

The server 1 uses satellite positioning such as a GPS or an autonomous positioning function of the user terminals 3A, 3B that are provided with a gyro sensor and an acceleration sensor using the current user location information acquisition unit 132, in order to acquire the current location information of the user (terminals 3A, 3B; description will be omitted hereafter). The acquired current location information of the user is transmitted to the server 1 and used for ascertaining the user's location. In addition, the measured current location information of the user is also used to identify the user's boarding location as well as for dispatch work.

The server 1 acquires the usage history information of each user that uses the commercial vehicle operation system by the usage history information acquisition unit 133. Specifically, the usage history information is information such as the number of times that each user used the system, the date and time of use, the area of use, and the commercial vehicle that was used, as well as the boarding location, destination, number of users, usage distance, usage fee, and the like, for each use.

The reservation information management unit 14 receives a dispatch/pickup use request from a user, who is a customer that uses the commercial vehicle operation system, and manages the reservation information of the system of each user. The reservation information management unit 14 includes a reservation information acquisition unit 141. In addition, the acquired reservation information is stored in a reservation information database 14DB when a reservation is received from a user, and is deleted from the reservation information database 14DB when the reserved dispatch/pickup work is completed.

The server 1 receives requests using the reservation information acquisition unit 141 such as when, from where to where, and with how many people, registered users would like to use the commercial vehicle operation system. The users operate the user terminals 3A, 3B to input the boarding location, destination, information regarding the number of passengers, etc., which are transmitted to the communication unit 11 of the server 1 via the communication network 5, and the server 1 thereby acquires the reservation information of each user.

The map information management unit 15 acquires from map information stored in a map information database 15DB, position information of standby locations where parking is possible, roaming travel route information based on a roaming travel command while there is no use request, the users boarding location and destination information, the predicted dispatch route information, and the like.

The on-board terminals 2A, 2B receive from the server 1, via the communication network 5, outputs of a roaming travel command, and a dispatch/pickup command to a user who made a dispatch reservation. In addition, the on-board terminals 2A, 2B transmit to the server 1, the current location information and the usage status of each of the commercial vehicles that are respectively equipped with the on-board terminals 2A, 2B. If the commercial vehicle is an unmanned operation vehicle equipped with an autonomous driving function, a control device mounted in the unmanned operation vehicle that has received a command executes dispatch control or roaming travel control. If the commercial vehicle is a manned operation vehicle, based on information received by the on-board terminals 2A, 2B, a video output device such as a display or an audio output device such as a speaker mounted in the vehicle notifies the driver of the content of the command, and the driver executes dispatch work or roaming travel work.

The user terminals 3A, 3B transmit use request information, the user's current location information, etc., to the server 1 via the communication network 5. Further, the user terminals 3A, 3B receive from the server 1 information relating to the commercial vehicle scheduled to be dispatched, the scheduled dispatch time to the boarding location desired by the user, scheduled arrival time to the destination, the scheduled usage fee information, and the like.

The vehicle standby location 4 is the place where the commercial vehicles of the commercial vehicle operation system are kept on standby when a next-use reservation has not been made. Specifically, a parking lot managed exclusively for the commercial vehicles of the commercial vehicle operation system, a privately owned hourly parking lot, the parking lot of a commercial facility, such as a supermarket, that can be used temporarily, a stopping lane along a road, and the like, may be assumed as the vehicle standby location 4. By means of the above-described vehicle standby location information acquisition unit 124, the server 1 searches the map information database 15DB to see whether the vehicle standby location 4 is in the vicinity of the target commercial vehicle and confirms the location information of the vehicle standby location 4. In addition, in the case that the vehicle standby location 4 is equipped with a communication network, said system can receive, via the communication network 5, information such as the number of vehicles and the size of the vehicle that can be parked in the vehicle standby location 4. The system can thereby receive the real-time availability status of the vehicle standby location 4, and system operation with less wasted time and unnecessary energy consumption becomes possible.

The communication network 5 is a prescribed wireless telecommunication network, such as the Internet, for carrying out bidirectional information communication between the server 1 and the on-board terminals 2A, 2B and the user terminals 3A, 3B. Further, as described above, in the case that a communication network is installed in the vehicle standby location 4 and that real-time usage status of the vehicle standby location 4 is being transmitted, it becomes possible for the server 1 to receive usage status information via the communication network 5.

First Embodiment

Figure 2:
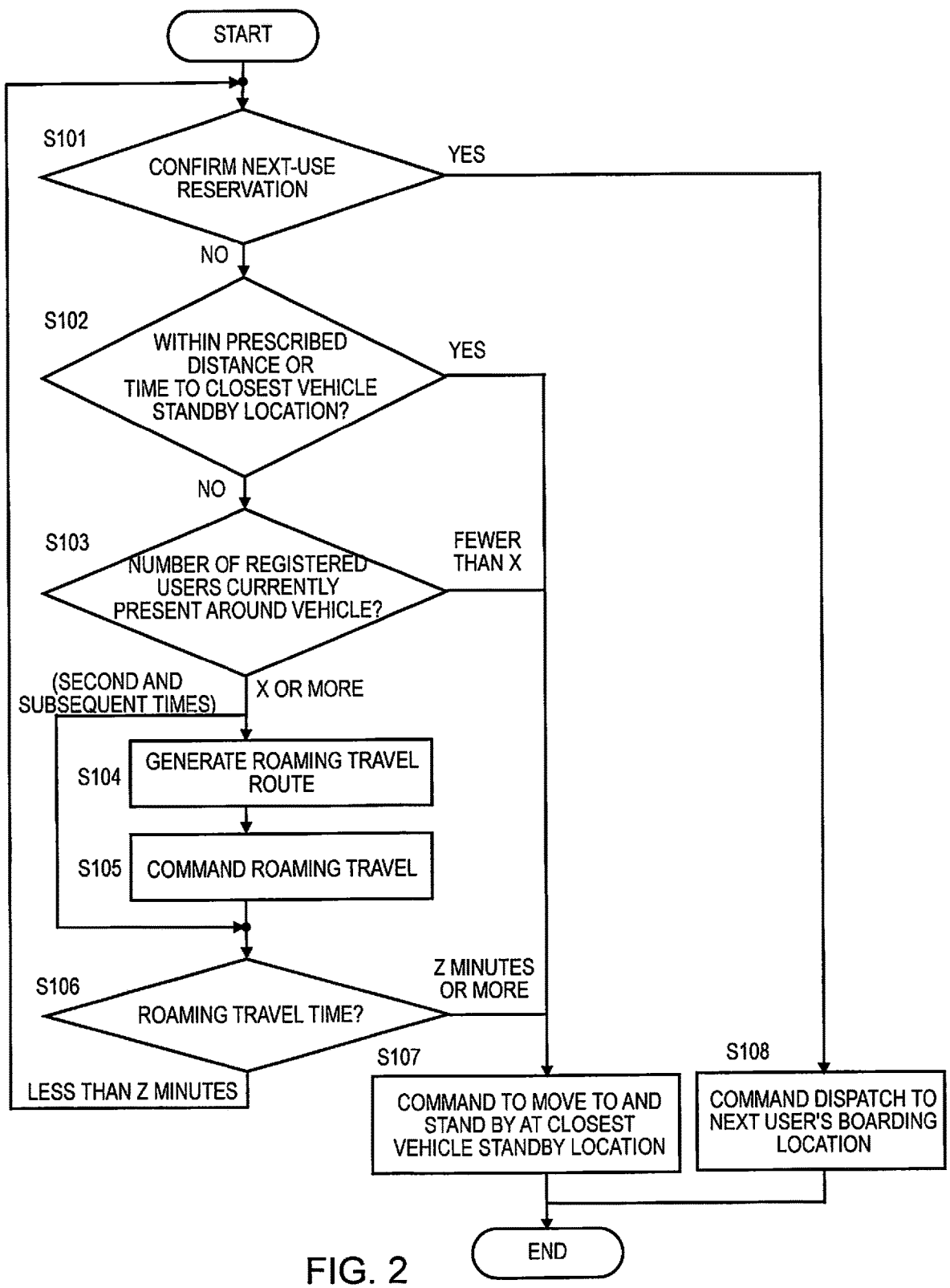
FIG. 2 is a first flowchart illustrating a control procedure of the commercial vehicle operation system according to the embodiment of the present invention.

Next, the processing sequence executed by each means included in the server 1 of the first embodiment will be described with reference to the flowchart of FIG. 2. The flowchart of FIG. 2 is repeatedly calculated at regular time intervals, for example, sampled each 10 ms.

In Step S101, the server 1 confirms the presence/absence of a next-use reservation from a user. A state in which a subsequent reservation is present means a state in which, with respect to a commercial vehicle in which a user A is riding, a different user B has made a reservation to use said vehicle after the transport of the user A is completed. If a next-use reservation is present, the process proceeds to Step S108, and the commercial vehicle receives a command output from the server 1 for its dispatch to the boarding location of the user B promptly after the completion of the transfer of the user A, and is dispatched. If there is no next-use reservation after the transfer of the user A has been completed, the process proceeds to Step S102.

In Step S102, the server 1 acquires the location information of the vehicle standby location 4 that has an available parking space and that is closest to the current location of the commercial vehicle, and determines whether the distance from the current location of the commercial vehicle to the target vehicle standby location 4 is within a prescribed range, or whether the predicted time to arrive at the target vehicle standby location is within a prescribed period of time. If it is possible to arrive at the target vehicle standby location 4 within a prescribed time or if the target vehicle standby location is within a prescribed distance, the process proceeds to Step S107, and the server 1 outputs a travel command instructing the commercial vehicle to move to the vehicle standby location 4. Conversely, if the target vehicle standby location 4 is farther away than the prescribed distance, or cannot be reached within the prescribed period of time, the process proceeds to Step S103.

In Step S103, the server 1 confirms the demand level for the target commercial vehicle. In FIG. 2, the server 1 determines, from the number of registered system user's information and the current user location information, whether there currently are X or more, or fewer than X, registered users of the commercial vehicle operation system within a prescribed range from the current location of the target commercial vehicle. It is determined that the target commercial vehicle should carry out roaming travel in the vicinity of the current location as the number of people increases, as the demands on the system at the current time increases, and as the probability that a next-use reservation will be made increases. As a specific example, if the number of registered users of the system within a 1 km radius from the current location area is less than 100, it is determined that demand is low, and the process proceeds to Step S107. In Step S107, the server 1 issues a command to the commercial vehicle to move to the vehicle standby location 4 closest to the current location of the commercial vehicle and to stand by until a next-use reservation is made. If the number of registered system users around the vehicle is greater than or equal to 100, since it is quite likely that a next-use reservation will be made in the vicinity of the current location, it is determined that the commercial vehicle should carry out roaming travel about the current location, and the process proceeds to Step S104.

In Step S104, a roaming travel route is generated. An optimal roaming travel route is generated in accordance with conditions input to the roaming travel route condition input unit 1262 described above.

In Step S105, the server 1 outputs a command to the commercial vehicle to carry out roaming travel over the roaming travel route generated in Step S104, and the commercial vehicle starts the roaming travel.

In Step S106, the server 1 determines whether to stop or continue the roaming travel in accordance with the elapsed time from when the commercial vehicle started the roaming travel. If the elapsed roaming travel time has exceeded a prescribed period of time of Z minutes or more, the server 1 ends the roaming travel of the commercial vehicle, and, in the process of Step S107, outputs a command to the commercial vehicle to move to the vehicle standby location 4 closest to the current location and a command to stand by until a next-use reservation is made. If the elapsed roaming travel time is less than the prescribed period of time of Z minutes, the process returns to Step S101, and the server 1 checks again whether a next-use reservation has been made based on the latest use reservation information. Otherwise, the process of Steps S102, S103, and S106 is repeated. The second and subsequent repeated processes of the route generation process of S104 and the travel command process of S105 are not executed and are skipped. If a new use reservation is received while the commercial vehicle is carrying out roaming travel, it is determined in the second or subsequent process of S101 that there is a next-use reservation, the process proceeds to Step S108, and the process of a dispatch command to the boarding location of the next user is executed.

Second Embodiment

Figure 3:
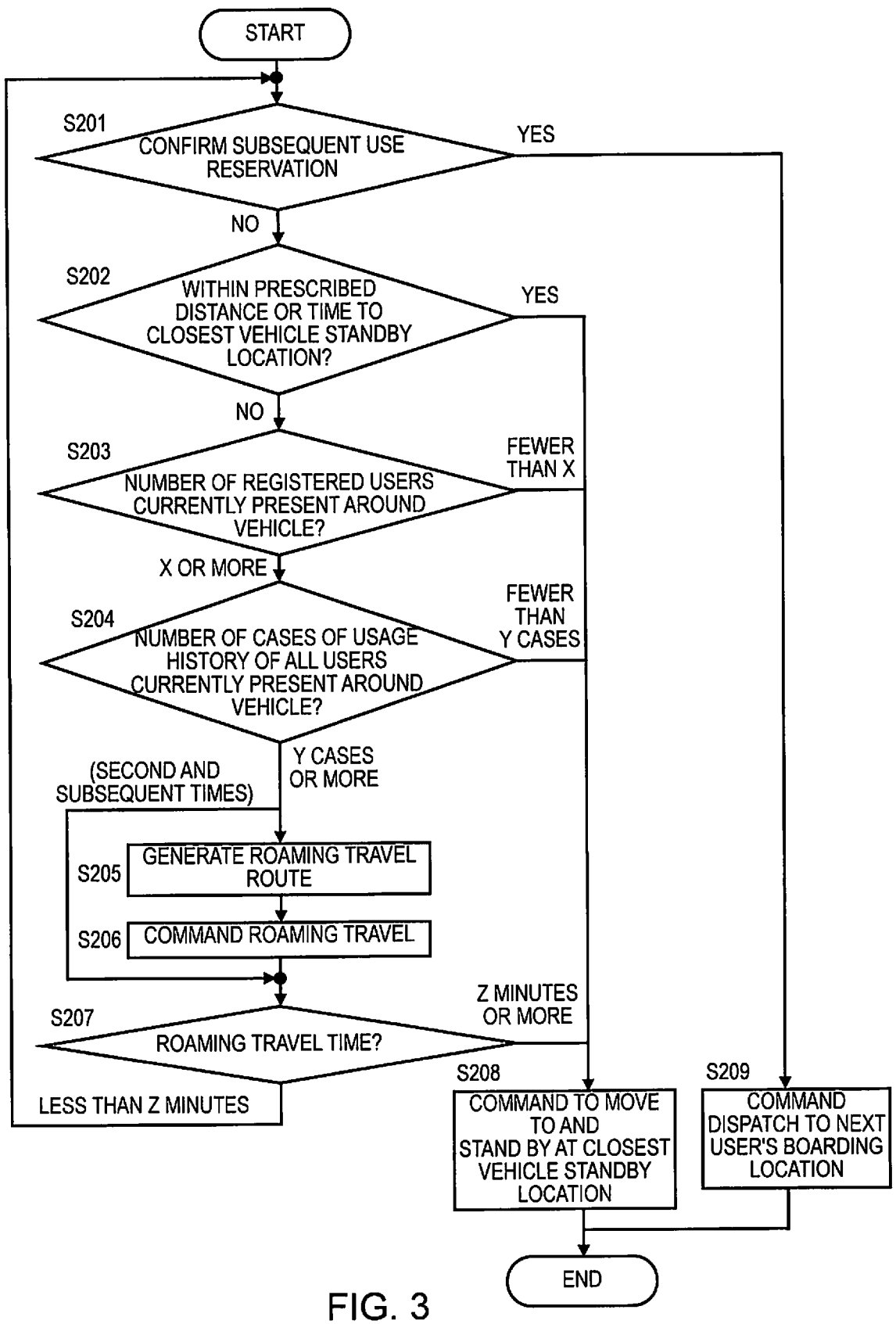
FIG. 3 is a second flowchart illustrating the control procedure of the commercial vehicle operation system according to the embodiment of the present invention.

The processing sequence executed by each means included in the server 1 of the second embodiment will be described with reference to the flowchart of FIG. 3.

In the second embodiment, a roaming travel execution determination process based on the usage history of Step S204 is added to the first embodiment. Thus, the first embodiment is incorporated for the processing of Steps S201-S203 and S205-S209.

Figure 4:
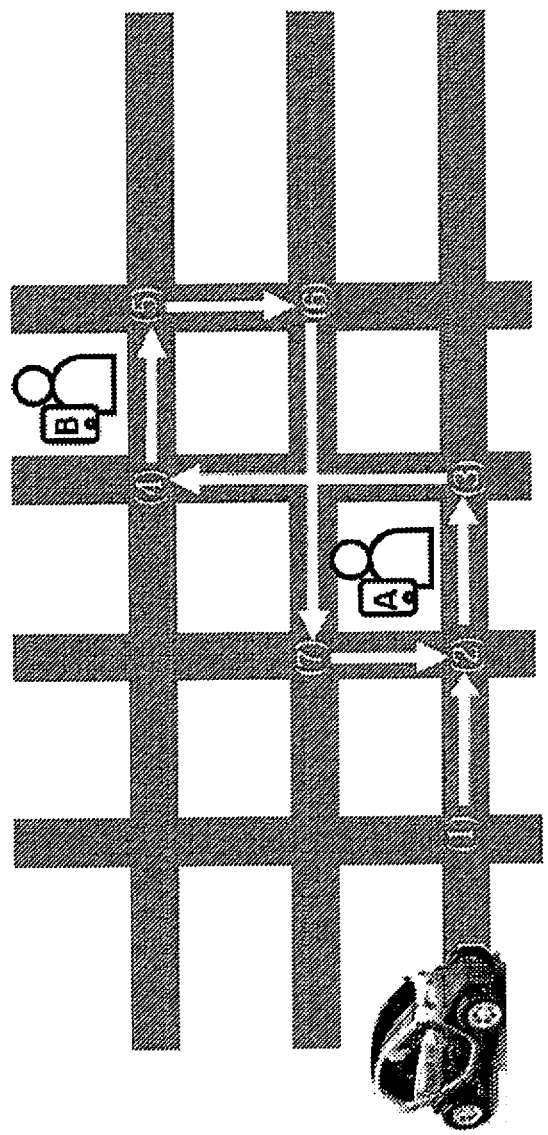
FIG. 4 is a diagram showing one example of a route diagram for the case in which a roaming travel route condition is the shortest user-access distance.

In Step S204, the server 1 computes the system usage history for all registered system users currently present within a prescribed range from the current location of the target commercial vehicle, and determines, based on the frequency of use, whether the target commercial vehicle should travel about the current location in a roaming manner, or move to the closest vehicle standby location 4 and stand by until there is a use request. In the example of FIG. 4, the number of cases of the usage history for all registered users currently present in the vicinity of the target vehicle is counted, and it is determined whether the number is Y cases or more. Specifically, assuming that the number of registered system users currently present within a prescribed range from the current location of the target commercial vehicle counted in Step S203 is 100, if the total number of cases of system usage for the past one month for all 100 of the users is 100 cases or more, it is determined that the commercial vehicle should travel about the current location in a roaming manner. On the other hand, if the total number of cases of system usage for the prior month for all 100 of the users is less than 100 cases, the server 1 outputs a command to the commercial vehicle to move to the vehicle standby location 4 closest to the current location of the commercial vehicle and to stand by until there is a next-use request.

In the process of Step S204, conditions other than the specific examples described above can be set. For example, the period of time for which the usage history is computed may be expanded to the past twelve months, the date for which history is to be acquired may be set to the usage history for the same date of the previous year, in order to obtain a better estimation of the actual situation, or the usage history for the same day of the week and the same time of day may be acquired, in order to determine whether the target commercial vehicle should carry out roaming travel.

In addition, in the first and second embodiment, the server 1 determines, in the roaming travel execution determination, whether to carry out roaming travel using the number of registered users currently present within a prescribed range from the target commercial vehicle, and the usage history of the currently present registered users, as indices of demand level, but no particular limitation is imposed thereby. That is, the indices of demand level may take into consideration characteristics of the current location of the target commercial vehicle itself, without limiting them to the currently present registered users. Specifically, if there is a commercial vehicle that has completed the last use and for which a next-use reservation has not been made, in the vicinity of an urban area, a train station, or a commercial facility where it is generally considered that demand for mobility services is high, even if the number of usage history cases of the registered users currently actually present in the vicinity of the vehicle is less than a prescribed value, the server 1 may use a multiplier that takes into consideration the characteristics of the current location, and determine that the demand level is greater than or equal to a prescribed value, so that roaming travel should be executed.

Next, the roaming travel route generation process of the first and second embodiments will be described.

The server 1 receives inputs of the travel route conditions set by the administrator that manages the commercial vehicle operation system using the route condition input unit 126. Examples of the type of travel routes include dispatch route, transfer route, and roaming travel route. A dispatch route is the route from the current location of the target commercial vehicle to the user's boarding location. A transfer route is the route from the user's boarding location to the destination. A roaming travel route is the street route over which the vehicle is made to travel without parking when there is no reservation for use and there are no parking or standing places for the commercial vehicle in the vicinity of the current location of the vehicle.

Examples of conditions for determining the dispatch route include the following conditions. The conditions may be used individually or in combination:
   the smallest energy consumed by the commercial vehicle;
   the shortest travel distance of the commercial vehicle;
   the ability to reach the destination earliest;
   the use of toll roads; and
   no use of toll roads.

Examples of conditions for determining the roaming travel route include the following conditions. The conditions may be used individually or in combination:
   the shortest mean arrival distance from the current location of the commercial vehicle to the current locations of the registered system users currently present within a prescribed range;
   the shortest mean arrival time from the current location of the commercial vehicle to the current locations of the registered system users currently present within a prescribed range;
   the smallest energy consumed by the commercial vehicle;
   the shortest roaming travel of the commercial vehicle;
   the largest number of registered system users present within a prescribed range from the current location of the commercial vehicle;
   the largest system usage history;
   the largest number of pedestrians and area residents; and
   the smallest amount of vehicle traffic.

Furthermore, the roaming travel route generation process will be specifically described with reference to FIGS. 4 and 5.

FIG. 4 is an example of a roaming travel route when the roaming travel route condition is set so as to minimize the access distance from the target user to the commercial vehicle. In FIG. 4, two users in possession of user terminals 3A, 3B, respectively, and that have been registered to use the commercial vehicle operation system are assumed to be within a prescribed range from the current location of the target vehicle. In this case, when one of the users makes a use request, a route is generated for the vehicle to travel on roads close to the points where the two users are located for as long as possible, such that the distance to access the commercial vehicle is minimized for both users. In the example of FIG. 4, a route is generated such that the vehicle carries out roaming travel on roads that are adjacent to the current locations of the users as much as possible. Specifically, the roaming travel route shown in FIG. 4 is generated such that the commercial vehicle passes each of the points (1) to (7) in numerical order. After passing point (7), the commercial vehicle repeatedly travels over a route sequentially passing through points (2) to (7) for a prescribed period of time.

Figure 5:
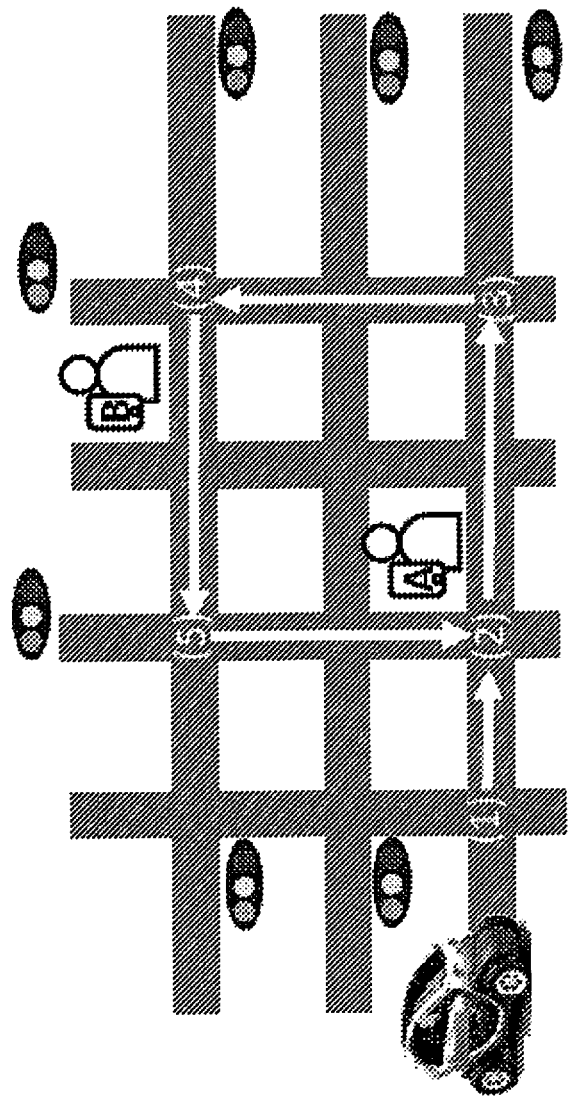
FIG. 5 is a diagram showing one example of a route diagram for the case in which the roaming travel route condition is energy conservation.

FIG. 5 is an example of a roaming travel route when the roaming travel route condition is set such that the commercial vehicle travels while conserving energy. In the example of FIG. 5, roads without traffic lights are utilized as much as possible as the roaming travel route in order to achieve energy conservation. In an urban area where in general there is much traffic and many traffic lights and intersections, there are increased number of starts/stops of the vehicle, which increase energy consumption, so that energy consumption is inevitably increased due to repeated accelerations/decelerations. In consideration of the foregoing, a route is generated such that the commercial vehicle travels on roads with as few traffic signals as possible. Specifically, the roaming travel route shown in FIG. 5 is generated such that the commercial vehicle passes each of the points (1) to (5) in numerical order. After passing point (5), the commercial vehicle repeatedly travels on a route sequentially passing through points (2) to (5) for a prescribed period of time. Conditions that can realize energy conservation are not limited to the example shown in FIG. 5. For example, a roaming travel route that achieves energy conservation may be generated with conditions such as utilizing map information to preferentially select a route with few height differences and gradients between slopes and roads, or utilizing congestion information to avoid congested roads as much as possible. Further, the number of pedestrian crossings and intersections may be taken into consideration as conditions that can realize energy conservation.

As described above, by means of the commercial vehicle operation system according to the present embodiment, the following effects can be achieved.

The commercial vehicle operation system according to the present embodiment can determine whether a commercial vehicle should travel about the current location in a roaming manner based on the current location information of the commercial vehicle, and can thereby exhibit the excellent effect that it is possible to reduce wasted time and unnecessary energy consumption that would otherwise be required to make a round-trip to and from a parking lot in which the vehicle is managed, and to provide to the user the service of the system more quickly and inexpensively.

In addition, the commercial vehicle operation system according to the present embodiment can acquire user information including at least the current location information of the user in order to determine whether a commercial vehicle for which a dispatch reservation is not present, should travel about the current location of the host vehicle in a roaming manner based on the current location information of the user, and can thereby exhibit the excellent effect of being able to provide the service of the system to the user more quickly, and while suppressing unnecessary energy consumption.

Further, the commercial vehicle operation system according to the present embodiment can determine whether to carry out roaming travel based on information on the current presence/absence of a use reservation. Thus, it exhibits the excellent effect that, by the commercial vehicle carrying out roaming travel, service can be provided to the user without loss of time if there is a reservation for use, and, even if there is none, service can be provided after waiting for a future reservation for use, while suppressing wasted time and unnecessary energy consumption otherwise required to make a round-trip to and from a parking lot in which the vehicle is managed.

In addition, the commercial vehicle operation system according to the present embodiment can determine whether to carry out roaming travel based on information on the presence/absence and location of a vehicle standby location where parking is possible in the vicinity of the commercial vehicle, and can thereby exhibit the excellent effect of being able to suppress unnecessary energy consumption due to avoidable travel.

Further, the commercial vehicle operation system according to the present embodiment can estimate potential system demand on the commercial vehicle operation system based on information regarding the number of registered system users currently present in a specific area within a prescribed range from the current location of the target commercial vehicle, the usage history within a set period of time in the past for all current users within a specific area, or the usage history within a set period of time in the past of the specific area itself. Thus, since it can be determined that the target vehicle should carry out roaming travel only when there is a high probability that the system will be used, it exhibits the excellent effect of being able to suppress wasted time and unnecessary energy consumption caused by the commercial vehicle being left unused.

In addition, since the commercial vehicle operation system according to the present embodiment can freely set a route for carrying out roaming travel for each vehicle type, it exhibits the excellent effect that it is possible manage freely roaming travel that takes into consideration various conditions (energy conservation, minimizing user access distance/time, travel environment, etc.).

The invention claimed is:

1. A commercial vehicle operation system comprises: a server that manages a service to dispatch and provide a commercial vehicle in accordance with a dispatch request of a user, the server comprising a communication unit configured to communicate with both a user terminal in possession of the user and the commercial vehicle that travels in accordance with the dispatch request, a vehicle operation information management unit configured to manage vehicle operation information including at least current location information of the commercial vehicle, a roaming travel execution determination unit configured to determine, with respect to a vehicle that is not provided with the service, whether the vehicle should be made to carry out roaming travel based on the current location information of the commercial vehicle, and the server instruct the vehicle to execute roaming travel in accordance with a determination result of the roaming travel execution determination unit.

2. The commercial vehicle operation system of claim 1, wherein the server further comprises a user information management unit that manages user information that includes at least current location information of the user, and the server determines whether the commercial vehicle should travel in a vicinity of the current location in a roaming manner based on the current location information of the user and the commercial vehicle, respectively.

3. The commercial vehicle operation system according to claim 2, wherein the server further comprises a reservation information management unit, and the server determines whether the commercial vehicle should travel about the current location in a roaming manner if a next-use reservation has not been made based on usage reservation information of the commercial vehicle acquired from the reservation information management unit.

4. The commercial vehicle operation system according to claim 3, wherein the server further comprises a vehicle standby location information acquisition unit that acquires information relating to a vehicle standby location where a vehicle can be parked, and the server determines that the commercial vehicle should travel about the current location in a roaming manner, where a distance from the current location of the commercial vehicle to a vehicle standby location is a prescribed distance or more, or where a time required to arrive at the vehicle standby location from the current location of the commercial vehicle is a prescribed period of time or more.

5. The commercial vehicle operation system according to claim 4, wherein the server further comprises a system demand estimation unit that estimates a system demand, which indicates a probability that the commercial vehicle operation system will be used within a prescribed range from the current location of the commercial vehicle, and the server determines that the commercial vehicle should travel about the current location in a roaming manner when the system demand is a prescribed value or more.

6. The commercial vehicle operation system according to claim 5, wherein the server acquires information regarding a number of registered system users who are registered to use the commercial vehicle operation system within a prescribed range from the current location of the commercial vehicle using the user information management unit, and the server estimates the system demand based on the information on the number of registered system users.

7. The commercial vehicle operation system according to claim 6, wherein the server further comprises a usage history information acquisition unit that acquires usage history of the system using the user information management unit, and the server estimates the system demand based on the usage history over a set period of time in past for all of the registered system users currently present within a prescribed range from the current location of the commercial vehicle.

8. The commercial vehicle operation system according to claim 7, wherein the server acquires the usage history over the set period of time in the past for a specific area within a prescribed range from the current location of the commercial vehicle using the usage history information acquisition unit, and the server estimates system demand based on the usage history over a certain period of time in the past for the specific area.

9. The commercial vehicle operation system according to claim 6, wherein the server further comprises a route generation unit that generates a route for roaming travel, a dispatch route from the current location of the commercial vehicle to a user's boarding location, and a transfer route from the user's boarding location to a destination, and the server outputs a command to the commercial vehicle to carry out roaming travel on a path generated by the route generation unit when the roaming travel execution determination unit determines that the commercial vehicle should carry out roaming travel.

10. The commercial vehicle operation system according to claim 9, wherein the server further comprises a roaming travel route condition input unit to which are input roaming travel route conditions for determining a route on which the commercial vehicle carries out roaming travel, and the route generation unit generates a roaming travel route in a vicinity of the current location of the commercial vehicle in accordance with at least one of the following roaming travel route conditions:

a shortest mean arrival distance from the current location of the commercial vehicle to the current locations of the registered system users currently present within a prescribed range, a shortest mean arrival time from the current location of the commercial vehicle to the current locations of the registered system users currently present within a prescribed range, a smallest energy consumed by the commercial vehicle, a shortest roaming travel of the commercial vehicle, a largest number of registered system users present within a prescribed range from the current location of the commercial vehicle, a largest system usage history, a largest number of pedestrians and area residents, and a smallest amount of vehicle traffic.

11. The commercial vehicle operation system according to claim 10, wherein the route generation unit determines the roaming travel route based on at least one of a height difference or gradient of a road, a number of traffic signals, a number of pedestrian crossings, number of intersections, and a congestion status, when the roaming travel route conditions include the smallest energy consumed by the commercial vehicle.

* * * * *